US008671102B2

(12) United States Patent
Reville et al.

(10) Patent No.: US 8,671,102 B2
(45) Date of Patent: Mar. 11, 2014

(54) SYSTEMS AND METHODS FOR EMERGING LITIGATION RISK IDENTIFICATION

(75) Inventors: Robert Thomas Reville, Los Angeles, CA (US); Siddhartha Ramanlal Dalal, Santa Monica, CA (US); Lauren Averell Caston, Venice, CA (US); David Sheldon Loughran, Los Angeles, CA (US); Kanaka Shetty, Los Angeles, CA (US)

(73) Assignee: The Rand Corporation, Santa Monica, CA (US)

( * ) Notice: Subject to any disclaimer, the term of this patent is extended or adjusted under 35 U.S.C. 154(b) by 61 days.

(21) Appl. No.: 13/264,734

(22) PCT Filed: Apr. 21, 2010

(86) PCT No.: PCT/US2010/031950
§ 371 (c)(1),
(2), (4) Date: Jan. 3, 2012

(87) PCT Pub. No.: WO2010/124029
PCT Pub. Date: Oct. 28, 2010

(65) Prior Publication Data
US 2012/0102051 A1 Apr. 26, 2012

Related U.S. Application Data
(60) Provisional application No. 61/171,763, filed on Apr. 22, 2009.

(51) Int. Cl.
*G06F 7/00* (2006.01)
*G06F 17/00* (2006.01)
(52) U.S. Cl.
USPC .......................... 707/751; 707/769; 705/311

(58) Field of Classification Search
USPC ........................................................ 707/751
See application file for complete search history.

(56) References Cited

U.S. PATENT DOCUMENTS

| | | | |
|---|---|---|---|
| 2002/0077865 A1* | 6/2002 | Sullivan | 705/3 |
| 2004/0093331 A1* | 5/2004 | Garner et al. | 707/3 |
| 2004/0193444 A1* | 9/2004 | Hufford et al. | 705/1 |
| 2004/0260876 A1* | 12/2004 | Singh et al. | 711/117 |
| 2005/0108084 A1* | 5/2005 | Ramamoorti et al. | 705/10 |
| 2006/0149604 A1* | 7/2006 | Miller | 705/4 |
| 2006/0212303 A1* | 9/2006 | James et al. | 705/1 |
| 2006/0271561 A1 | 11/2006 | Schlachta-Fairchild et al. | |
| 2007/0239490 A1 | 10/2007 | Sullivan | |
| 2008/0046260 A1* | 2/2008 | Ghielmetti et al. | 705/1 |
| 2008/0071578 A1* | 3/2008 | Herz et al. | 705/3 |
| 2008/0148398 A1 | 6/2008 | Mezack et al. | |
| 2009/0198527 A1* | 8/2009 | Guerrero | 705/4 |
| 2009/0299767 A1 | 12/2009 | Michon et al. | |
| 2010/0082382 A1* | 4/2010 | Kisin et al. | 705/7 |

* cited by examiner

Primary Examiner — Binh V Ho
(74) Attorney, Agent, or Firm — Foley & Lardner LLP

(57) ABSTRACT

A computer-implemented method, by a computer having a computer processor, of identifying emerging risks of agents causing harms to a particular system comprises accessing, via a computer network, an electronic document database comprising document data; inputting a set of criteria, which includes a selected set of agents and a selected set of harms to a particular system, specified by a user; extracting a subset of the document data that satisfies the set of criteria; generating, with the processor, an array containing agent-harm coincidences from the extracted subset of the document data; assessing, with the processor, statistical significance of each agent-harm coincidence relative to other agent-harm coincidences; compiling, with the processor, risk data, based on the statistical significance, of agents of the selected set of agents causing harms of the selected set of harms to the particular system; and outputting the risk data.

40 Claims, 6 Drawing Sheets

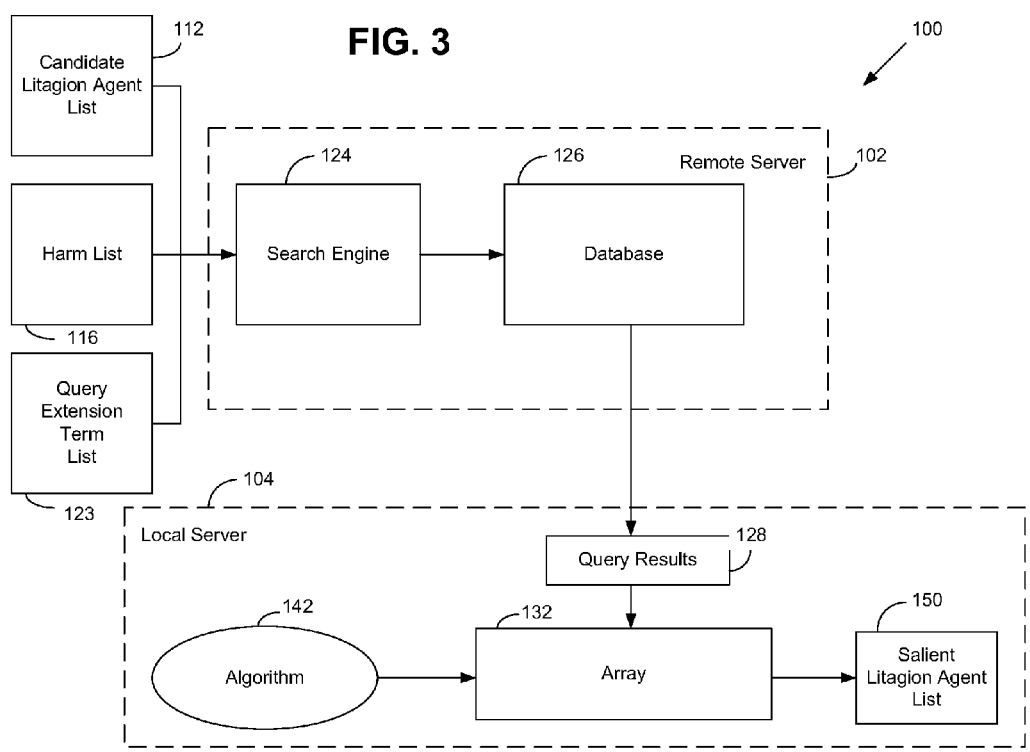

| litagion | biliary | bonejoint | breast | cognitive |
|---|---|---|---|---|
| [1332-21-4]_[Asbestos] | 1.4375 | 22.15625 | 30.375 | 21.375 |
| [80-05-7]_[bisphenol A] | 5.5 | 14.75 | 111 | 19 |
| [UnknownCAS]_[Carbon nanotubes] | 0 | 39.5 | 14 | 2 |
| [84-65-1]_[9,10-anthraquinone] | 3 | 1.53125 | 7.75 | 3 |
| [3380-34-5]_[Triclosan] | 1 | 7.0625 | 7 | 2.53125 |
| [79-06-1]_[Acrylamide] | 0.0625 | 9.359375 | 29.375 | 17.625 |
| [UnknownCAS]_[electromagnetic fields] | 0 | 61.25 | 117 | 101.03125 |
| [553-24-2]_[Neutral Red] | 0.125 | 5.625 | 7.1875 | 2.25 |
| [71-43-2]_[Benzene] | 4.234375 | 50.03125 | 41.59375 | 26.125 |
| [71267-22-6]_[N'-nitrosoanatabine] | 0 | 0 | 0 | 0 |
| [68758-85-0]_[N-(4-tert-butylbenzoyl)-2-hydr | 0 | 0 | 0 | 0 |
| [69-65-8]_[Mannitol] | 6.359375 | 26.15625 | 21.609375 | 28.296875 |
| [67-56-1]_[Methanol] | 10.75 | 30.59375 | 74.9375 | 67.90625 |
| [92-67-1]_[4-biphenylamine] | 0 | 0 | 4.875 | 0 |
| [93-76-5]_[2,4,5-Trichlorophenoxyacetic Acid] | 1.375 | 2.90625 | 4.875 | 3.0625 |

| connective | ear | endocrine | eye | gastrointesti | heart_other |
|---|---|---|---|---|---|
| 106.390625 | 0.703125 | 9.125 | 8.4375 | 205.890625 | 63.546875 |
| 55.625 | 0 | 161.5 | 1.75 | 2.5 | 5 |
| 74 | 0 | 15 | 5 | 5 | 10 |
| 11.1875 | 1 | 3.0625 | 1.5 | 8.25 | 4.5 |
| 6.3125 | 0.5 | 6.5 | 2.1875 | 0 | 0.5 |
| 22.3125 | 0.125 | 17.21875 | 12.640625 | 15.0625 | 7.75 |
| 34.75 | 27.28125 | 36 | 23.375 | 5.125 | 101.46875 |
| 133.875 | 1.625 | 11.96875 | 32.53125 | 4 | 6.96875 |
| 56.140625 | 10.765625 | 31.703125 | 18.671875 | 7.953125 | 25.203125 |
| 0 | 0 | 0 | 0 | 0 | 0 |
| 0 | 0 | 0 | 0 | 0 | 0 |
| 44.703125 | 11.59375 | 80.40625 | 54.1875 | 25 | 80.984375 |
| 101.09375 | 15.46875 | 81.703125 | 100.65625 | 25.8125 | 39.5625 |
| 1.5 | 0 | 0 | 0 | 1.375 | 0.5 |
| 6.5 | 0 | 11.9375 | 0 | 1.125 | 2.46875 |

| hematologic | immune | liver | liver_cancer | lung |
|---|---|---|---|---|
| 189.4375 | 81.015625 | 29.96875 | 7.65625 | 1045.10938 |
| 55.8125 | 45.125 | 84.5625 | 4.5 | 10 |
| 68 | 62 | 26 | 3 | 85 |
| 20.5625 | 3.625 | 23.28125 | 3.625 | 3.25 |
| 5.1875 | 14.4375 | 9.40625 | 1 | 1 |
| 56.3125 | 14.328125 | 35.59375 | 3.75 | 12.71875 |
| 159.0625 | 80.5625 | 15.40625 | 8.5 | 21.125 |
| 68.203125 | 19.21875 | 48.421875 | 31 | 20.40625 |
| 416.3125 | 55.640625 | 197.90625 | 16.6875 | 101.421875 |
| 0 | 0.5 | 0 | 0 | 0 |
| 0 | 0 | 0 | 0 | 0 |
| 130.171875 | 80.046875 | 94.640625 | 9.296875 | 70.5625 |
| 206.265625 | 82.734375 | 284.4375 | 28.390625 | 64.046875 |
| 7.1875 | 2.375 | 20.1875 | 6.625 | 4.875 |
| 9.78125 | 4.625 | 11.90625 | 2.0625 | 4.3125 |

FIG. 6

SYSTEMS AND METHODS FOR EMERGING LITIGATION RISK IDENTIFICATION

CROSS-REFERENCE TO RELATED PATENT APPLICATIONS

This application claims priority from Provisional Application U.S. Application 61/171,763, filed Apr. 22, 2009, incorporated herein by reference in its entirety.

SUMMARY OF THE DISCLOSURE

Various embodiments relate to a computer-implemented method, by a computer having a computer processor and a storage medium, of identifying emerging risks of one or more agents causing one or more harms to a particular system. The method may include, but is not limited to, any one or combination of (i): accessing, via a computer network, an electronic document database comprising document data; (ii) inputting a set of criteria specified by a user, the set of criteria comprising a selected set of agents and a selected set of harms to a particular system; (iii) extracting a subset of the document data from the electronic document database that satisfies the set of criteria; (iv) generating, with the computer processor, an array based on the subset of document data, extracted from the electronic document database, the array containing agent-harm coincidences from the extracted subset of the document data; (v) assessing, with the computer processor, statistical significance of each agent-harm coincidence of the array relative to other agent-harm coincidences in the array; (vi) compiling, with the computer processor, risk data of one or more agents of the selected set of agents causing one or more harms of the selected set of harms to the particular system, the risk data based on the statistical significances of the agent-harm coincidences in the array; and (vii) outputting the risk data.

BRIEF DESCRIPTION OF THE DRAWINGS

FIG. 3 is a generalized representation of a risk identification and prioritization system according to an embodiment of the present invention;

FIG. 6 illustrates an exemplary array of candidate litagion agents and harms.

DETAILED DESCRIPTION

Figure 1:
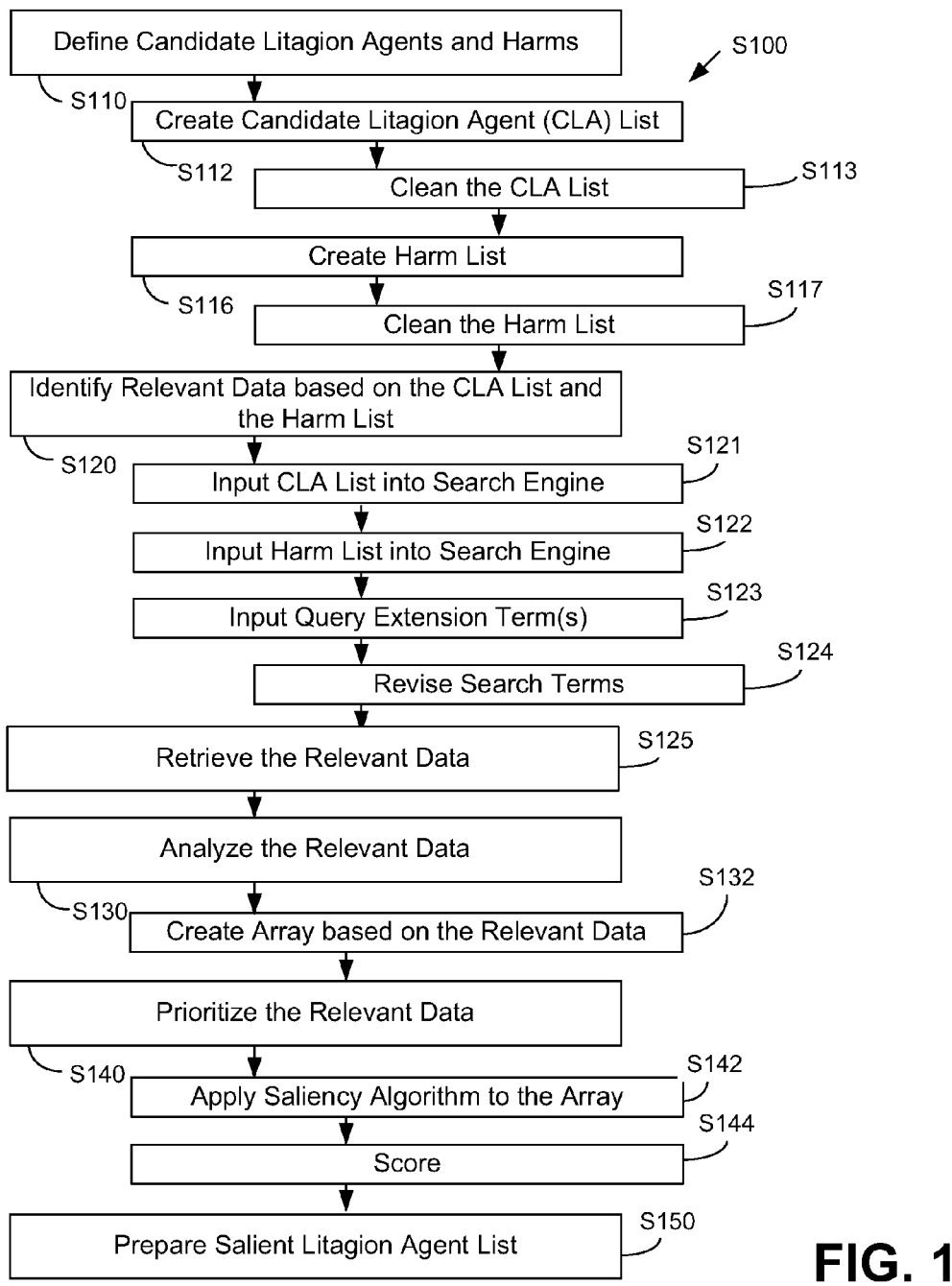
FIG. 1 illustrates a flow chart of a risk identification and prioritization process according to an embodiment of the present invention.

Various embodiments are directed toward helping insurance companies writing commercial liability insurance assess their exposure to the risk of mass litigation. A mass-litigation episode is the occurrence of a large number of lawsuits alleging liability for harm that have a correlated or common fact basis. At the center of a mass-litigation episode is a litagion agent.

Throughout various embodiments, a litagion agent is a material, substance, product, service, or practice that is a common denominator in a mass-litigation episode. In various embodiments, the common denominator may be the element of a mass-litigation episode that creates correlation across losses in an insurer's underwriting portfolio. Asbestos is the canonical example of a litagion agent. The association of asbestos with mesothelioma, asbestosis, and other health conditions has led to litigation against a large number of insured businesses that spans a wide variety of industries. Applying limits on insurance policies is insufficient to protect insurers from losses that encompass a significant portion of their underwriting portfolio. However, a litagion agent need not be a material or substance. A business service or practice might also be a litagion agent. For example, sub-prime lending practices, options-backdating, "laddering" in Initial Public Offerings, and/or the like are all common denominators of mass litigation and therefore litagion agents.

The latency inherent in the risk posed by a given litagion agent is a reason why it can generate correlated losses within an insurer's underwriting portfolio. In the asbestos example, exposure to asbestos causes mesothelioma and the realization of associated symptoms typically occurs many years following the exposure. As a result, an insurer's exposure to asbestos liability risk accumulated for many years prior to the realization of the harm. The accumulation involves the potential activation of multiple policy years as injured parties are exposed in different years for multiple years.

Latency takes other forms as well. For example, the realization of a harm may occur proximately to litagion agent exposure, but the understanding that the litagion agent causes harm may emerge many years later. Likewise, even when it is well understood that the litagion agent causes the harm (e.g., physical harm caused by firearms), legal principles for establishing liability may evolve slowly. Regardless of the source, latency may allow exposure to the litagion agent to accumulate without the knowledge of the insurer.

Various embodiments record information relevant to evaluating the likelihood that a candidate litagion agent will result in mass litigation. In particular, the evolution of academic literatures can provide an early warning mechanism for mass litigation exposure. In particular embodiments, progress of scientific inquiry in several dimensions, including toxicology, epidemiology, and medicine, as well as related research in business and law may be monitored. The monitoring may be targeted to identify and track litagion agents and related legal principles. This approach is facilitated by the recent migration of academic publishing from paper form to online databases.

The universe of candidate litagion agents numbers in the tens, if not hundreds, of thousands. Thus, various embodiments may be directed to defining the universe of candidate litagion agents and prioritizing them. In some embodiments, the universe of candidate litagion agents may be further categorically limited to a set of candidate litagion agents. In particular embodiments, identification may mean the process of prioritizing the list of candidate litagion agents for further analysis. In some embodiments, prioritization may allow development, implementation, and maintenance resources to be allocated in a cost-effective manner.

Various embodiments may provide relevant information on candidate litagion agents long before claims are made. This may facilitate the tracking of exposures as they accumulate over time on occurrence-trigger policies (the majority of commercial general liability in the United States) and across the portfolio at a point in time for claims-made and occurrence-based policies. Throughout various embodiments, the identification and prioritization methods may be accomplished through automated data collection from authoritative sources and the application of well-defined rules and algorithms.

Insurance companies track mass-litigation risks in an ad-hoc manner that generally only allow insurance companies to track mass-litigation risks that have already emerged and for which significant exposures have already accumulated. Accordingly, various embodiments are directed to methods and systems of defining a vast array of potential mass-litigation risks, both well known and obscure, and prioritizing those risks for further study. Various embodiments may allow for the use of the evolution of the scientific literature as an early-warning system for mass litigation risks.

Thus, in various embodiments, the universe of candidate litagion agents may be categorized and defined, authoritative sources for lists of such litagion agents may be identified, and data-driven methods for prioritizing the resulting list of candidate litagion agents according to objective criteria may be developed to transform clusters of research (e.g., academic literature) into a statistically significant list of litagion agent-harm pairs.

Various embodiments include program products comprising computer-readable media for carrying or having computer-executable instructions or data structures stored thereon. Such computer-readable media can be any available media that can be accessed by a general purpose or special purpose computer or local server (e.g., 104 in FIG. 3). By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data that cause a general purpose computer, special purpose computer, or special purpose processing device to perform a certain function or group of functions.

In addition to a system, various embodiments are described in the general context of methods and/or processes, which may be implemented in one embodiment by a program product including computer-executable instructions, such as program code, executed by computers in networked environments. It should be noted that the terms "method" and "process" may be synonymous unless otherwise noted. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

In some embodiments, the method(s) and/or system(s) discussed throughout may be operated in a networked environment using logical connections to one or more remote computers (e.g., 102 in FIG. 3) having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local 104 and remote memory storage devices 102. In various embodiments, data may be stored either in repositories and synchronized with a central warehouse optimized for queries and/or for reporting, or stored centrally in a database (e.g., dual use database) and/or the like.

An exemplary system for implementing the overall system or portions of the invention might include a general-purpose computing device in the form of a conventional computer, including a processing unit, a system memory, and a system bus that couples various system components including the system memory to the processing unit. The system memory may include read only memory (ROM) and random access memory (RAM). The computer may also include a storage medium, such as a solid state storage device and/or a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules, and other data for the computer.

Software and Web implementations of the present invention could be accomplished with standard programming techniques with rule-based logic and other logic to accomplish the various database searching steps, correlation steps, comparison steps and decision steps. It should also be noted that the words "component" or "module" as used herein is intended to encompass implementations using one or more lines of software code, and/or hardware implementations, and/or equipment for receiving manual inputs.

FIGS. 1-4 show an identification (and/or prioritization) system 100 (e.g., FIG. 3) and a process S100 (e.g., FIG. 1) for executing the system 100. In various embodiments the system 100 or method S100 may allow for identifying risks substantially simultaneously as new hypotheses are made by scientists and research based on those hypotheses are pursued that a particular harm is caused by a particular substance or agent. Such embodiments may provide an early warning system based on those findings. Accordingly, various embodiments relate to a process and/or system for extracting a signal representative of academic research and trends thereof to identify risks based on the signal. This may allow, for example, insurance companies or other entities to develop infrastructures based on these findings.

In step S110 (e.g., FIG. 1), candidate litagion agents and/or harms may be defined. In step S112, a list or set, such as a candidate litagion agent list 112, may be created or otherwise developed containing names (and/or other identifiers) of candidate litagion agents.

Throughout various embodiments, the universe of candidate litagion agents may be classified in a plurality of ways. In some embodiments, the process S100 may include a classification scheme that lends itself to identifying authoritative lists of candidate litagion agents. For example, in some embodiments, the classification scheme may divide litagion agents into four categories: (i) Chemical substances; (ii) Biological agents; (iii) Radiation; and (iv) Products. Other embodiments may employ a classification scheme dividing candidate litagion agents into any number of categories (including 1 category) and/or may include categories that include, but are not limited to, some or all of the exemplary categories discussed.

With respect to chemical substances, in various embodiments, they may be defined as (but not limited to) any organic or inorganic substance of a particular molecular identity, including (i) any combination of such substances occurring in whole or in part as a result of a chemical reaction or occurring in nature and (ii) any element or uncombined radical, for example as defined by the Toxic Substances Control Act (TSCA). Alternative embodiments may employ a different definition for a chemical substance.

Various embodiments may include chemical substances that are deliberately or inherently incorporated into commercially available products (e.g., asbestos incorporated in insulation) or chemical substances that are generated in the course of manufacturing or using a commercially-available product (e.g., sulfur dioxide generated in the course of burning coal for electricity).

In various embodiments, the candidate litagion agent list 112 may be based on, but not limited to, on the TSCA Chemical Substance Inventory list, or TSCA Inventory 112a. In some embodiments, identifiers, such as the Chemical Abstract Service (CAS), for the candidate litagion agents of the TSCA Inventory candidate litagion agent list 112a may be provided. Other common identifiers may include the substance common name given by NLM's MeSH Index, ChemIDPlus, or the International Union of Pure and Applied Chemistry (IUPAC).

In further embodiments, the candidate litagion agent list 112 may be based on one or more other lists that cover materials or substances. These other lists 112b-112q may be combined with (or used in alternative of) the TSCA Inventory 112a to define the universe of candidate litagion agents. In yet further embodiments, identifiers, such as the CAS, of the candidate litagion agents of each list may be used (e.g., merged with that of the other list(s)).

Accordingly, in various embodiments, the candidate litagion agent list 112 may include, but is not limited to, chemical substances, pesticides, food additives, dietary supplements, color additives, cosmetics, over-the-counter ingredients, environmental pollutants, substances that have been evaluated for carcinogenic or risk or reproductive harm, naturally-occurring chemical substances (e.g., alcohol, tobacco, latex, caffeine, fatty acids, human growth hormone, etc.); biological agents; ionizing and/or non-ionizing radiation; emerging technologies; and/or consumer products.

Some non-limiting examples of lists may include those based on Pesticide Product Information System (PPIS); the Everything Added to Food in the United States (EAFUS) Inventory; the Food Contact Substances Inventory maintained by the US Food and Drug Administration (FDA); National Health and Nutrition Examination Survey (NHANES); California's Proposition 65; lists maintained by the Center for Disease Control (CDC), NLM, NIH, the World Health Organization (WHO); OECD; and/or the like.

Through various embodiments employing multiple candidate litagion agent lists as discussed above, the resulting list of candidate litagion agents 112 may be large and may likely contain duplicate substances. Thus, in some embodiments, in step S113, the resulting list 112 may be revised. For instance, the resulting list 112 may be reduced to eliminate duplicates by cross-referencing CAS numbers (or other identifiers such as common name) of each item in the list to remove similar entries, collecting synonyms, and/or the like. In further embodiments, this may include identifying CAS numbers (or other identifier) where possible and/or working to clean the chemical names by identifying common name usage for substances for which there exists no CAS number (or other identifier). Then, for example, the most common usage name can be associated to each unique CAS number (or other identifier), for example according to the NLM ChemIDplus Lite system, or the like. In some embodiments, the candidate litagion agents within the candidate litagion agent list 112 may be prioritized in some defined manner as described in this disclosure.

Figure 2A:
FIG. 2(a) is a generalized representation of a candidate litagion agent list.
Figure 2B:
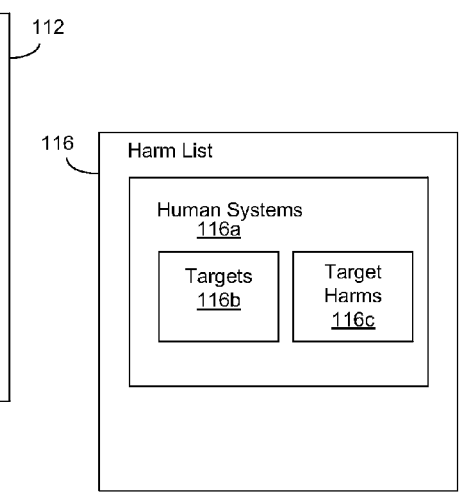
FIG. 2(b) is a generalized representation of a harm list.

With reference to FIGS. 1 and 2(b), in step S116 a harm list 116 may be created containing various human harms. Further embodiments may employ a harm taxonomy comprising a plurality of categories, which may contain a hierarchy of sub-categories. Such embodiments, may allow for reducing the number of possible harms into a smaller number of categories, thus reducing search effort and combining related diseases. Various embodiments may adapt taxonomy schemes already used by authoritative sources, such the National Library of Medicine's taxonomy of human harms, and/or the like. In other embodiments, the harm list 116 need not be limited to human harms, but may include (but is not limited to), financial injury, environmental injury, and/or the like.

Chemical substances (or other candidate litagion agents), for instance, can harm the human body in myriad ways and thus a suitable taxonomy of such harms may be employed in some embodiments. In particular embodiments, to create the taxonomy, a list of human systems 116a may be created. The human system list 116a, for example, may be developed using a classification scheme from the Medical Subject Headings (MeSH) system. In further embodiments, the human body can be categorized into a plurality of systems. For example, the human body may be categorized into distinct systems, such as, but not limited to, musculoskeletal, digestive, respiratory, urogenital, endocrine, cardiovascular, nervous, sensory, stomatognathic, hemic and immune, embryonic, and/or integumentary. Other embodiments may include other categories, such as tissue, organ, and/or the like. Various embodiments may employ classification schemes, such as MeSH (or other suitable classification scheme), that classifies subcomponents of each of these systems into a list of targets 116b and associated target harms 116c. In particular embodiments, a list of target harms 116c may be derived from, for example, but is not limited, MeSH, the NLM's Haz-Map database, NTP's "Summary of Target Organs," Karolinska Institute's list of Specific Diseases and Disorders, and/or the like. It should be noted that harm taxonomies are not limited to the human body, but may be created in similar fashion for other areas, such as the environment, finance, etc.

In further embodiments, in step S117, the resulting list 116 of target-harm pairs may be reviewed and/or revised. For instance, target-harm pairs that were non-sensible may be dropped, redundancies may be eliminated, some target-harm pairs may be further described, additional target-harm pairs may be added (e.g., on an ad hoc basis).

Throughout various embodiments, the harm list 116 may include a list of target-harm pairs, for example as previously described. In other embodiments, the harm list 116 may be created in any suitable manner, for example on an ad hoc basis, as a pre-established harm list (e.g., one based on Karolinska Institute's list of Specific Diseases and Disorders), in a similar manner as the candidate litagion agent list 112 (e.g., FIG. 2(*a*)) was created, and/or the like.

Figure 2C:
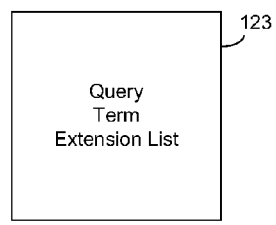
FIG. 2(c) is a generalized representation of query term extension list.

With reference to FIGS. 1-3, in step S120 relevant documents or information may be identified from a document corpus based on the candidate litagion agent list 112 and the harm list 116. Thus, various embodiments may employ a document corpus (database) 126 and a search mechanism (search engine) 124 by which to search the document corpus 126. In some embodiments, the document corpus 126 may be PubMed, RePorter, the world wide web, and/or the like. Further non-limiting examples include Google Scholar, MSN Health, and/or the like. In some embodiments, the search mechanism 124 may be PubMed's search engine or other search engine (e.g., a search engine associated with the document corpus 126).

In various embodiments, the candidate litagion agent list 112 and the harm list 116 (e.g., harm taxonomy) may be queried against the document corpus 126 using the search mechanism 124. For instance, in some embodiments, identifying the relevant documents (e.g., step S120) may comprise any one or combination of the following. In step S121, the candidate litagion agent list 112 may be inputted into, for example via the search mechanism 124, or otherwise applied to a knowledge base or database 126 (e.g., document corpus 126, such as PubMed) to identify relevant documents (e.g., publications) within the database 126 that match or otherwise relate to a term of (or associated with) the candidate litagion agent list 112. In particular embodiments, a number of the relevant documents may be identified.

In step S122, the harm list 116 may be inputted into, for example via the search mechanism 124, or otherwise applied to the database 126 to identify relevant documents within the database 126 that match or otherwise relate to a term of (or associated with) the harm list 116. In particular embodiments, a number of the relevant documents may be identified. It should be noted that these steps (i.e., steps S121 and S122) and/or any other steps may be performed substantially simultaneously, in any order, repeated, and/or omitted.

In particular embodiments, by querying both the candidate litagion agent list 112 and the harm list 116 against the database 126, relevant documents within the database 126 may be identified that match or otherwise relate to a term from (or associated with) each of the candidate litagion agent list 112 and the harm list 116. In particular embodiments, a number 127 (refer to FIG. 4) of the relevant documents may be identified.

Once the lists are inputted, the server 102 (and/or local server 104) may be configured to query the database 126 using the candidate litagion agent list 112 and the harm list 116. In particular embodiments, the server 102 (and/or local server 104) may be configured to query the database 126 automatically to update query results 128 at regular intervals.

In step S123, a list of (one or more) query extension terms 123 (e.g., FIG. 2(*c*)) or filters may be inputted or otherwise applied to the candidate litagion agent list 112 and/or the harm list 116. In addition, or in the alternative, the query term extensions list 123 may be inputted or otherwise applied when one or more of the candidate litagion agent list 112 and the harm list 116 are inputted into the search mechanism 124 or with (e.g., before, after, or during) analyzing of the data (e.g., S130 described later). That is, the query extension terms list 123 may be applied at any point (and/or any number of times) during the process S100.

For example using a PubMed search, a query extension term, such as (but not limited to) "tox[sb]" may be used to identify academic articles that deal with a broad range of toxicology issues and the like. The query extension terms may allow for refining a search and/or to remove certain material. For example, a query extension term, such as "drug therapy [sh]" may be used to filter results where the document discusses that the litagion agent may be therapeutic. Various other filtering methods may be employed to filter results. For example, certain terms may be targeted only to certain portions of articles, such as (but not limited to) the abstract, or particular types of articles. While further embodiments may employ additional search terms, for example "risk" or the like may be used to filter results that do not contain the term "risk."

In some embodiments, in step S124, search terms, such as terms provided in the candidate litagion agent list 112, harm list 116, query extension term list 123, and/or the like, entered into the search engine 124 may be processed, for example, to include synonyms, remove redundancies, match keywords, and so on. For instance, search terms entered into the PubMed search engine may be automatically processed by the NLM's Entrez PubMed database. Entrez PubMed rewrites user queries to comply with MeSH terminology and add synonyms as necessary. In some embodiments, the search terms may be revised.

In some embodiments, query terms may also be searched via keyword matching. In further embodiments, any search term that PubMed (or other search engine) cannot term-match either in MeSH and/or as a keyword may be eliminated from the query. By deriving a list from MeSH (or similar system), the probability that the harm terms are all recognized by PubMed (or other search engine) may be increased.

In various embodiments, some substances, such as chemical substances, may be referred to in a variety of ways. Accordingly, in some embodiments, multiple identifiers may be used or otherwise inputted. For example, in a case where PubMed is the database 126, a chemical substance may be inputted by its common name, for example as defined by MeSH, ChemIDplus Lite or the like, and/or its unique CAS number (or other identifier).

In step S125, relevant data 128 (e.g., relevant documents as identified in step S120) may be extracted or otherwise retrieved from the database 126. In further embodiments, the relevant data 128 may be transmitted to the local server (or computer) 104 or other server. In particular embodiments, software may be used to retrieve the relevant data 128, which may comprise publications (or portions thereof), publication counts, and/or identification codes (or other identifiers) from the database 126, for example, based on the candidate litagion agent list 112 and the harm list 116. For instance, the software may use the candidate litagion agent list 112 and the harm list 116 and any query extension terms as its inputs, and may then enter those search terms into the search engine for 124 searching the database 126 and return relevant publications (or portions thereof), publication counts, and/or identification codes (or other identifiers). Thus in various embodiments, the publications (or portions thereof), publication counts, and/or identification codes (or other identifiers) that are relevant, and thus returned, are those publications that include at least one term from each of the candidate litagion agent list 112 and the harm list 116 (or meet other defined criteria). It should be noted that the identification and retrieval of relevant publication steps (e.g., including, but not limited to, steps S120 and S125) and/or any other steps may be performed substantially simultaneously, in any order, repeated, and/or omitted.

In some embodiments, in a case where a unique index (ID) (or other identifier) is available for the publications, the ID (e.g., 128) for each (some or all) of the relevant publications may be retrieved (e.g., downloaded to the local server 104 or the like) corresponding to a query for each candidate litagion agent of the candidate litagion agent list 112 and each harm of the harm list 116 respectively. Thus in various embodiments, the IDs that are relevant, and thus returned, are the IDs of those publications that include at least one term from the candidate litagion agent list 112 and the IDs of those publications that include at least one term from the harm list 116. In further embodiments, the publication counts (e.g., 128; 127 in FIG. 4) corresponding to a particular candidate litagion agent and harm may be obtained by taking intersections of the corresponding ID sets locally (e.g., on the local server, associated computer terminal, and/or the like). In general, regular set operations may be used to obtain various subsets of counts for compound harms and/or litagion agents.

As discussed, the relevant data 128, which may comprise relevant publications (or portions thereof), publication counts, and/or identification codes (or other identifiers) may be retrieved or otherwise downloaded to a repository, such as (but not limited to) the local server 104 or the like. Accordingly, in step S130, the query results (or relevant data) 128, from querying (i.e., identification and retrieval steps (e.g., steps S120 and S125)) may be analyzed. For instance, the local server 104 (or other associated computer medium) may be configured to analyze the query results 128. Analyzing the query results 128 may comprise any one or combination of the following.

In step S132, a contingency table or array (e.g., two-dimensional array) 132 may be created based on the query results 128. In particular embodiments, the local server 104 (or other associated computer medium) may be configured to transform the query results (or relevant data) 128 (e.g., the retrieved publications (or portions thereof), publication counts, and/or identification codes (or other identifiers)) into the representative two-dimensional array 132 in FIG. 4. Each cell within the array 132 may correspond to a litagion agent-harm pair.

Figure 4:
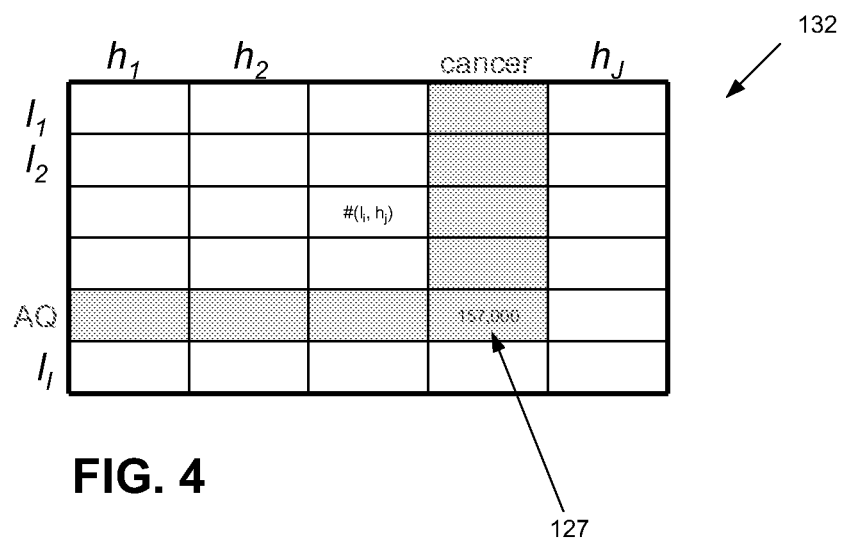
FIG. 4 illustrates an exemplary array of candidate litagion agents and harms.

For example, in FIG. 4, a cell corresponding to the pair (i.e., where the pair crosses one another) of the candidate litagion agent "AQ" and the harm cancer lists a publication count 127 totaling 157,000. In this example, the process S100 (refer to FIG. 3) has identified and/or retrieved a count of 15,007 publications, which may correspond to the number of publications in which both the terms "AQ" and "cancer" were identified.

With reference to FIGS. 1-4, as previously discussed, in other embodiments, the search results (e.g., relevant publications (or portions thereof), publication counts, and/or identification codes (or other identifiers)) need not be downloaded or otherwise transmitted to the local server 104, computer, or the like. In such embodiments, for example, the query results 128 may be processed (e.g., transformed into an array) on the remote server (or other computing medium).

Thus in various embodiments, an array 132 or a contingency table of hypotheses may be generated based on (but not limited to) inputting some or all of a candidate litagion agent list 112, a harm list 116, and a query extension term list 123 into a document corpus 126 via a search mechanism 124. Throughout various embodiments, any or all the steps discussed in this disclosure may be performed in real time or as otherwise required.

Alternatively or in addition, separate queries of the candidate litagion agent list 112 and the harm list 116 may be performed to download the relevant publications (or portions thereof), publication counts, and/or identification codes (or other identifiers), to the local server 104 or the like. Once on the local server 104, the relevant publications (or portions thereof), publication counts, and/or identification codes (or other identifiers) may be crossed in an array (e.g., 132), for example, as described in this disclosure. Because the candidate litagion agent results and the harm results are being processed locally, such embodiments may reduce processing time and burden.

In various embodiments, instead of a pure aggregation of all publications collected from PubMed (or other document corpus 126), the count of each cell in the contingency table may be constructed according a number of different parameters. For example, in some embodiments, the average citation half-life in published scientific and academic journals as reported by Thompson Reuters may be used to weigh those documents from recent years more heavily than documents published years or decades ago.

According to various embodiments, each unique document retrieved from PubMed by the querying mechanism may be time stamped with the year (or other suitable period) it is published. If there were N citations that reference both "AQ" and "cancer", in some embodiments and for example, this number can therefore be broken down as follows:

$$N = \sum_{i=1948}^{current.year} N_i \quad (2.1)$$

where current.year is the current PubMed indexing year (which is always one year prior to the current calendar year), 1948 is the first year PubMed indexes publications, and $N_i$ is the number of publications referring to both "AQ" and "cancer" published in the $i^{th}$ year. Then the "attenuated" count, which incorporates citation half-life, could be computed as follows.

Let Y be the integer year half-life (the least integer function of the average citation half-life), $$I = \left\lfloor \frac{current.year - 1948}{Y} \right\rfloor, \quad (2.2)$$

$$A_n = \sum_{i=current.year-Y(n+1)+1}^{current.year-Yn} \text{ for } n = 1, \ldots, IY, \quad (2.3)$$

$$A_0 = \sum_{i=current.year-Y}^{current.year+1} N_i, \quad (2.4)$$

and $$A_{IY+1} = \sum_{i=1948}^{current.year-IY} N_i. \quad (2.5)$$

If C denotes the attenuated count of the "AQ" and "cancer" association, then $$C = \sum_{n=0}^{IY+1} c_n A_n \quad (2.6)$$

where $c_n \leq 1$ is the attenuation degree.

To heuristically reflect "half-life", this may be set to $$c_n = \frac{1}{2^n}.$$

Figure 5:
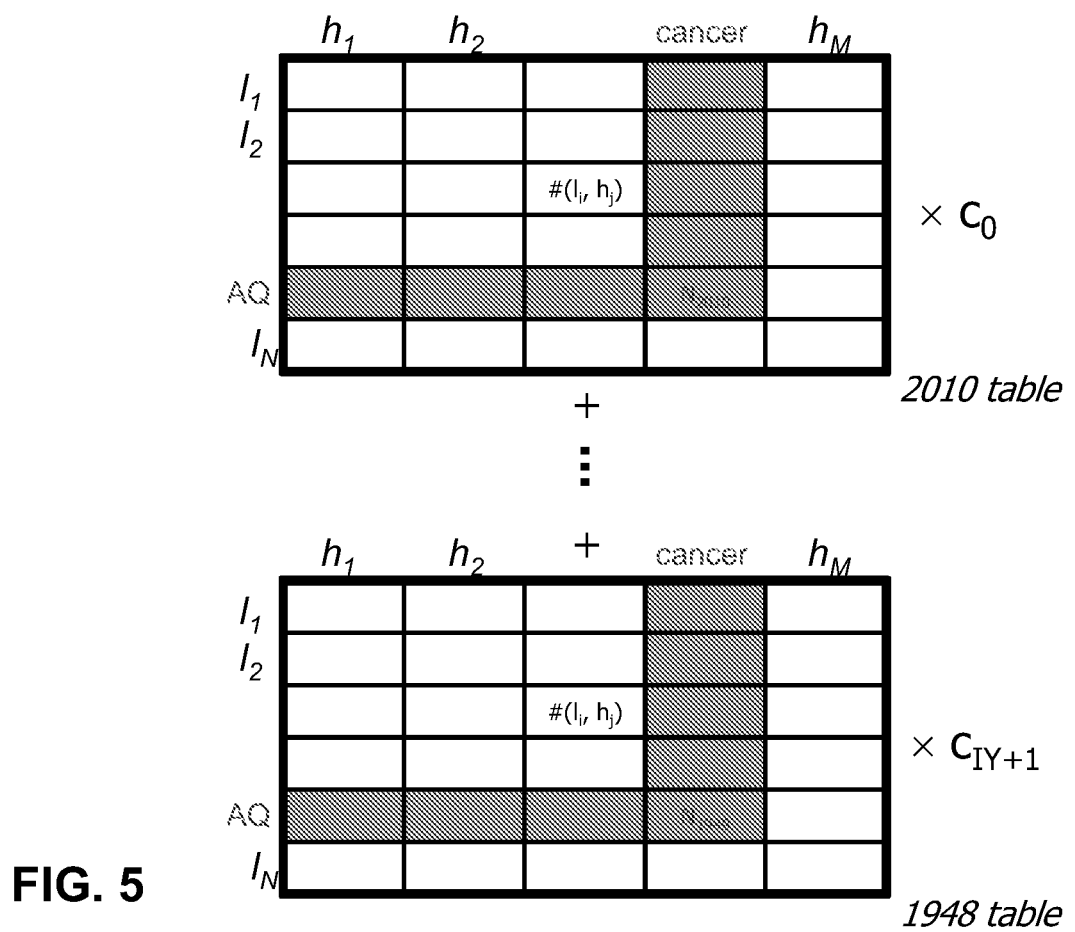
FIG. 5 illustrates an exemplary set of arrays of candidate litagion agents and harms.

According to this methodology, the contingency table itself can be interpreted as times sheets as shown, for example in, FIG. 5. This manner of representing the aggregate contingency table as multiple contingency tables sliced by year may also allow for "time slicing" and the computation of the First Year Salient metric (as will be described).

In some embodiments, prioritization of litagion agents can be derived from the attenuated contingency table produced by replacing the aggregate count N in each cell with the attenuated count C.

As previously discussed, prioritization can be based on the evolution (or signal) of the scientific literature which can provide an early warning system for litagion agents. In particular embodiments, an assumption may be made that a given litagion agent poses a relatively high risk of mass litigation if the scientific community appears to be relatively interested in the hypothesis that the litagion agent could cause human harm at relevant exposure levels. In some embodiments, statistical significance within array 132 may be referred to as scientific saliency, or simply as saliency. Thus in some embodiments, scientific saliency may be an approach to identify the emergence of scientific literature related to a litagion agent. Therefore, in various embodiments, scientific saliency may be employed to prioritize among candidate litagion agents.

With reference to FIGS. 1-4, in step S140, the query results 128 may be prioritized, for example, to identify litagion agents that warrant attention (e.g., additional research). Such litagion agents may be an emerging risk as discussed in this disclosure. In various embodiments, prioritizing (e.g., step S140) may comprise applying a scientific saliency algorithm 142 to the array 132 (e.g., to the litagion agent-harm pairs) (step S142).

For instance, the algorithm 142 may be applied to the array 132 (or otherwise applied to the search results) by the local server 104 (or other computer medium) to search for litagion agent-harm pairs that are statistically significant (i.e., salient) within the array 132. For example, the algorithm 142 may be used to search for a divergence of candidate litagion agent-harm pairs from statistical independence. Accordingly, a list 150 of litagion agents that are statistically significant within the array 132 may be prepared (S150). In addition or in the alternative, the list 150 may contain statistically significant litagion agent-harm pairs.

Thus, in various embodiments, data may be collected from clusters of research (e.g., database 126), such as academic literature), processed by a computer medium, and transformed by a computer medium (e.g., local server 104) into a list of statistically significant litagion agents (e.g., list 150) that may be used to identify emerging risks. Such embodiments or portions thereof may be carried out using a local server (e.g., local server 104), an associated computer terminal, and/or the like. As noted, the clusters of research may be a signal or the like representative of academic research (or trend thereof) that can be processed and transformed by a computing device to prepare a list of statistically significant litagion agents that may be used to identify emerging risks. In particular embodiments, in step S144, the prioritized list may be weighted or scored based on varying criteria. For example, agent-harm pairs discussed in recent documents may be weighted more than those discussed in older documents. In such embodiments, for example, the scored list may be used to prepare the list 150.

Throughout various embodiments, scientific saliency is neither a necessary nor a sufficient condition. Other additional or alternative methods may be employed to identify materials and substances, such as novelty (discussed below) and/or the like. In some embodiments, one or more filters and/or prioritization steps may be applied to the list of salient candidate litagion agents to capture, for instance (but not limited to), greater social loss, relevance to insurance coverage, exposure, and/or the like.

In general, scientific saliency may be measured for any candidate litagion agent. However, in some embodiments, it makes little sense to measure scientific saliency for candidate litagion agents that are known to be harmful (e.g., *Escherichia coli*) or that are to known to have been extensively studied (e.g., electromagnetic frequency). Consequently, in such embodiments, such candidate litagion agents are not prioritized based on scientific saliency. However, it should be noted that various other embodiments may measure scientific saliency for litagion agents that are known to be harmful and/or that are known to have been substantially studied.

With respect to ligation agent-harm pairs, scientific saliency is a statistic that measures the relative frequency that a particular litagion agent-harm search term (e.g., asbestos and mesothelioma) occurs in the scientific literature. Heuristically, the more frequently a given litagion agent-harm pair occurs in the scientific literature relative to other litagion agent-harm pairs, the more salient the hypothesis that the litagion agent causes the harm. The frequency of documents in which a given litagion agent-harm pair occurs is a signal, indication, and/or the like. A saliency algorithm may be employed to evaluate the strength of the signal relative to all candidate litagion agent-harm pairs. Accordingly, this signal may be used to identify emerging risks.

In various embodiments, scientific saliency may not measure the strength of the evidence linking a litagion agent and harm. That is, in such embodiments, greater scientific saliency does not necessarily correspond to greater certainty that a given litagion agent causes a given harm. Instead, in such embodiments, the assumption or hypothesis is that scientific saliency measures scientific interest. Scientific interest, in turn, is a function of the plausibility of the link between the litagion agent and the harm and the potential for humans to be exposed to the litagion agent at meaningful levels. Thus in some embodiments, it may be assumed that, all else equal, scientists will be less interested in investigating the link between a litagion agent and harm if there is no reasonable expectation that humans could be exposed to the litagion agent or if there are other reasons to believe that, by its very nature, the litagion agent is likely to be benign.

In various embodiments, one or more algorithms, as will be set forth, may be employed to measure the saliency of a litagion agent-harm pair, for example, that is part of an array 132. Assume a list of N litagion agents, $l_i$, and M harms, $h_j$. The $(i,j)^{th}$ entry of the contingency table is the number of documents in the corpus recorded by querying "$l_i$ and $h_j$" via the search mechanism. For example, if $l_i$="bisphenol-a", $h_j$="breast cancer", the corpus is PubMed (www.pubmed.org), and the search mechanism is PubMed's online search engine, then the $(i,j)^{th}$ entry is: 121, which is the number of articles, according to the PubMed search engine containing the terms bisphenol-a and breast cancer. (e.g., accessed at 5:00 p.m. PST on Mar. 17, 2010).

If the litagion agents and harms were not associated in the table, then the entries would correspond to statistical independence. Thus, in some embodiments, the contingency table data may be analyzed to determine which $(l_i, h_j)$ pairs are most salient in the sense that they are statistically farthest away in the positive direction from the hypothesis of independence within the context of this table. Let $X_{ij}=\#(l_i, h_j)$ be the observed document frequency entered in the (i,j)th cell of the contingency table. Let $X_i=\Sigma_j X_{ij}$ be the total number of documents in the table containing the term $l_i$ and $X_j=\Sigma_i X_{ij}$ be the total number of documents in the table containing the term $h_j$. Let $m_{ij}=E[X_{ij}]$ be the expected value of the $(i,j)^{th}$ entry given some distribution of $X_{ij}$. Conditional on the total count of entries in the contingency table, it can be shown that the $X_{ij}$ are distributed multinominally with mean $m_{ij}$.

In further embodiments, the "salient" cells (litagion agent-harm pairs) must be identified in the contingency table. For this reason assume there is a benchmark against which comparisons need to be made and identify the hypotheses that are significant departures from that benchmark. As previously mentioned, one benchmark is statistical independence, but the benchmark need not be so limited.

Suppose a set of estimated values for $m_{ij}$ is $\hat{m}_{ij}$. Denote the standard deviation of $(X_{ij}-\hat{m}_{ij})$ by $s_{ij}$. Then, under appropriate regularity conditions, there is:

$$z_{ij}=(X_{ij}-\hat{m}_{ij})/s_{ij} \quad (3.1)$$

as the standardized residuals which are approximately normal. In some embodiments, though the $z_{ij}$'s will be correlated, given that M and N are large, the correlations will be small and so the correlations may be disregarded or corrected by using the concept similar to approximations based on approximating degrees of freedom.

Let Z denote the standard normal variable with mean 0 and standard deviation 1 and let $\Phi(z)$ denote the corresponding cumulative distribution function. Let $p=1-\Phi(z)=Pr(Z>z)$, be the p-value corresponding to Z (the probability of observing an event as extreme as z under the Normal distribution). It can be shown that under the benchmark theory, p's corresponding to Z's in (3.1) are independent and uniformly distributed on [0,1]. Given this result, the hypothesis of independence of a given litagion agent-harm pair at some significance level can be tested by comparing the observed p-value with the significance level.

In various embodiments, this statistical test may require some modification in order to account for the fact a very large number of hypotheses, possibly numbering in the millions, is being tested. Even though the probability of a particular litagion agent-harm pair being declared salient could be very small, given the large number of hypotheses, a large number could nonetheless be declared statistically significant, potentially resulting in a large number of false positives. Thus in some embodiments, a generalization of this algorithm proposed by Dalal and Mallows (1992), which guarantees that the false positive rate does not exceed some pre-specified level among all pairs, may be employed.[1]

[1] For complete details, see S. R. Dalal & C. L. Mallows, *Buying With Exact Confidence*, in 2 THE ANNALS OF APPLIED PROBABILITY, No. 3, 752-765 (1992), the entirety of which is hereby incorporated by reference.

Let $p_{[k]}$ be the ordered p-values in decreasing order, k=1, . . . , MN, corresponding to $z_{ij}$. Let $\{c_k, k=1, 2, . . . , K\}$ be a monotonically decreasing sequence between (0,1) as prescribed in Dalal and, Mallows (1992). Now let k be the largest integer between 1 and MN, such that $p_1 > c_1$, $p_2 > c_2, . . . , p_k > c_k$, and $p_{k+1} < c_{k+1}$. If the Z's are in increasing order, then the largest k between 1 and MN may be found, such that $z_1 \leq \Phi^{-1}(1-c_1)$, $z_2 \leq \Phi^{-1}(1-c_2)$, . . . , $z_k \leq \Phi^{-1}(1-c_k)$, and $z_{k+1} \geq \Phi^{-1}(1-c_{k+1})$. Accordingly, it may be concluded that all of the hypotheses from k+1, k+2, . . . , MN represent a significant departure from the benchmark theory at some level $(1-\alpha)$.

In some embodiments, the $c_k$'s may be computed following Dalal and Mallows (1992). The exact algorithm is an iterative solution to a sequence of difference equations where the number of terms in the difference equations increases with the total number of pairs. Specifically, it is shown that the $c_n$'s are solutions to $$q_n+nc_nq_{n-1}+(n(n-1)/2)c_{n-1}^2 q_{n-2}+ \ldots +nc_2^{n-1}q_1+c_1^n=1 \quad (3.2)$$

where the c's are obtained by iteratively setting $q_1=q_2= \ldots =1-\alpha$.

Dalal and Mallows (1992) further show that, asymptotically:

$$c_n=-\ln(1-\alpha)/\{n-\ln(1-\alpha)/2\} \quad (3.3)$$

For any given n, this is an approximation that is found to be quite good even for small n. For example, for $\alpha=0.1$, the approximation yield $c_k$'s within $10^{-4}$ for n>4. Various optimality properties of this procedure are proven in Dalal and Mallows (1992). Further they show that the asymptotic probability of one or more false positive is $(1-\alpha)$.

In general, for a given positive integer g>0, one can compute $$c_n=A/\{n+(g+A)/2\} \quad (3.3a)$$

where A is defined as a solution of $(1-\alpha)=\exp(-A)\{1+A+A^2/2!+ \ldots +A^g/g!\}$.

Then asymptotically the probability of observing more than m false positive is $(1-\alpha)$.

In further embodiments, this can be used to improve the power thereby reducing the number of false negatives.

In further embodiments, a benchmarking hypothesis may be proposed. Specifically, one useful benchmark may be that litagion agents and harms are independent. Under the independence null hypothesis, $H_o$:

$$H_o: m_{ij}=m_i m_j/m \quad (3.4)$$

where $m_i=\Sigma_j m_{ij}$, $m_j=\Sigma_i m_{ij}$, and $m=\Sigma_i\Sigma_j m_{ij}$. The alternative hypothesis of positive association, $H_1$, is:

$$H_1: m_{ij} > m_i m_j/m \quad (3.5)$$

Under the null hypothesis:

$$\hat{m}_{ij}=x_i x_j/x \quad (3.6)$$

where $x_i=\Sigma_j x_{ij}$, $x_j=\Sigma_i x_{ij}$, $x=\Sigma_i\Sigma_j x_{ij}$
$\hat{m}_{ij}$ has standard error $$s_{ij}=\sqrt{\hat{m}_{ij}(1-x_i/x)(1-x_j/x)} \quad (3.7)$$

Thus, it can be shown that $$z_{ij}=(x_{ij}-\hat{m}_{ij})/\sqrt{\hat{m}_{ij}(1-x_i/x)(1-x_j/x)} \quad (3.8)$$

is the standardized Pearson Residual, which is approximately normally distributed under the independence hypothesis.[2] In various embodiments, these renormalized Z's may be used. Again, the Z's are correlated, but the correlations are small since they are similar to multinomial probabilities for large number of classes. In further embodiments, the theory developed so far may be applied to compute p-values and the corresponding method for identifying salient cells.

[2] See ALAN AGRESTI, CATEGORICAL DATA ANALYSIS 81 (2d ed. 2002), the entirety of which is herein incorporated by reference.

In various embodiments, a time-stamp of PubMed publications (or documents from another corpus or database) may allow saliency to be computed historically. For example, the contingency table may be separated as a series of time sheets as discussed, for example, with respect to the attenuation function. For instance, these time-stamped contingency table sheets can be aggregated from 1948 to any year after 1948, including the current calendar year. Moreover, attenuation could be applied to any aggregation subset.

If N again refers to number of PubMed citations that reference both a particular candidate litagion agent, say "AQ", and a specific harm, say "cancer", and $N_i$ is the number of all such citations from the $i^{th}$ year, 1949<i<current calendar year, then let $$N^{[t.s.year]} = \sum_{i=1948}^{t.s.year} N_i$$

denote the aggregate count of PubMed citations up to the t.s.year, which is the desired timesliced year. When t.s.year is the current calendar year, $N^{[current]}=N$ from the attenuation section.

For any time-sliced year earlier than the current calendar year, the attenuation function can be applied according to the same construction as in the attenuation section by replacing current.year with t.s.year and by re-defining $A_0$ as $$A_0^{[t.s.year]} = \sum_{i=t.s.year-Y}^{t.s.year} N_i.$$

Then similarly, $$C^{[t.s.year]} = \sum_{n=0}^{lY+1} c_n A_n^{[t.s.year]}$$

and saliency can be applied to these attenuated, time-sliced contingency tables. For notation, let $CT^{[t.s.year]}$ denote the attenuated time-sliced contingency table for the year [t.s.year]. A candidate litagion agent and harm pair, L-H, is called "salient in [t.s.year]" if it is salient with respect to $CT^{[t.s.year]}$.

Accordingly, in various embodiments, time slicing facilitates the definition of an important metric, "first year salient", or FYS. Given any salient L-H pair, FYS is the earliest t.s.year so that L-H is salient against $CT^{[t.s.year]}$. This definition is well-defined for all salient L-H pairs. Among a variety of potential uses, the FYS metric may be used to verify the saliency model and framework by comparing FYS to regulatory listing dates (e.g., Proposition 65's list date), important dates in the context of litigation, or insurance claims. The predictive power of the saliency machinery could be measured against these or other performance criteria. Moreover, in some embodiments, FYS could be used as a measure of "emergence" in the context of saliency.

In further embodiments, measuring scientific saliency can be further refined. For instance, in some embodiments, the candidate litagion agent list 112, the harm list 116, and/or the list of query expansion terms 123 (and/or uses thereof) may be further defined as needed, for example as discussed in this disclosure. Some embodiments can include differential weighting of publications so that, for instance, review studies carry greater or lesser weight than the underlying documents, or studies with higher "impact scores" have greater weight.

In further embodiments, the most statistically salient litagion agent-harm pairs may be removed or otherwise ignored. In yet further embodiments, a method ("star dimming") may be applied. In star dimming, the algorithm 142 may be re-run to search for the litagion agent-harm pairs that are the next most statistically salient. Such embodiments, may allow, for example, for disregarding known litagion agent-harm pairs (e.g., asbestos-mesothelioma) while identifying statistically salient litagion agent-harm pairs that are not as well known. Thus in some embodiments, some viable—in terms of, for example, identifying emerging risks—litagion agent-harm pairs may emerge after running the algorithm for multiple iterations.

In various embodiments, various corpora, in addition to or in the alternative to PubMed or the like, may be queried depending on the risk involved. For example, corpora directed to financial injuries, environmental injuries, medical proposals (as opposed to medical publications as previously described), product failures, and/or the like may be queried.

In various embodiments, one or more corpora may be queried and/or have their respective collected data combined, for example, in a virtual database. The results may be processed (e.g., combined) by the algorithm 142, for example, in a manner previously described. For instance, in some embodiments, the candidate litagion agent list 112 and the harm list 116 may be input into each of a first database (e.g., 126) and a second database (not shown). In such embodiments, for example, litagion agent-harm pairs can be identified using broader corpora.

In some embodiments, an alternative (or additional) document corpus may be employed, such as, for example, Research Portfolio Online Reporting Tools (RePorter), which is an online database of funded NIH grants. NIH funds a large fraction of biomedical research conducted in the United States. The existence of grants investigating novel chemical substances might provide a leading indicator of scientific interest in that chemical substance. Various other embodiments need not be limited to RePorter, NIH funded grants, and/or research done in the United States.

In various embodiments, litagion agent (and/or candidate litagion agent) may be defined as follows: A substance, material, or product that causes a bodily injury in those exposed to a commercial product and, as a result, leads to mass litigation in the United States.

Other embodiments may have different definitions for litagion agents as discussed throughout. For example, the litagion agent may not be limited geographically to the United States, but may be limited to any particular country or countries, region, and/or the entire world. As another example, the litagion agent need not be limited to those that cause bodily injury, but may also include financial injury, psychological injury, environmental damage (e.g., from hurricanes, consumer products, etc.), property damage, and/or the like.

Yet as another example, the litagion agent need not be limited to mass litigations and/or commercial products, but may also include claims and/or the like and various services, practices, and/or the like, respectively. Thus in various embodiments, the litagion agent may be defined as narrowly or broadly as required.

In various embodiments, the litigation agent definition may include some or all of, but not limited to, the following considerations: (i) Business practices that indirectly and/or directly cause bodily injury; (ii) Litagion agents that cause financial injury, which may include or exclude litagion agents that cause financial injury because of bodily injury; (iii) Litagion agents that cause property damage; and (iv) Litagion agents that cause environmental damage, which may include or exclude litagion agents that cause one or both of environmental damage (e.g., harm to fish and wildlife) and bodily injury (e.g., injury due to consumption of contaminated fish and wildlife). In further embodiments, the litagion agent may include or exclude prescription pharmaceuticals and/or Class III medical devices as defined by the Food, Drug, and Administration (FDA) may be categorically excluded.

In various embodiments, the agent list and the harm list may be inputted into the search mechanism. In other embodiments, one of the lists (e.g., the agent list) may be inputted into the search mechanism to retrieve results (or associated data) that contain, for example, at least one item of the inputted list to a local server (or the like). Then the other list (e.g., harm list) may be queried, at the local server, against the retrieved results to obtain results that contain, for example, at least one item of the other list. Accordingly, the obtained results would contain, for example, at least one item from each of the lists.

EXAMPLE

FIG. 6 illustrates an array 144' of agent-harm coincidences according to an embodiment of the present invention. The array 144' and the data (e.g., the candidate litagion agent list 112 and the harm list 116) used to prepare the array is presented for illustrative purposes only and is not intended to be used for any purpose other than visualizing the array 144' and the potential output of the methods described in the disclosure.

With reference to FIGS. 1-3 and 6, in step S110, a candidate litagion agent list 112 and a harm list 116 (step S116) may be defined, for example, as described above. For instance, in step S112, the list 112 of candidate litagion agents may include 15 candidate litagions including asbestos, bisphenol A, carbon nanotubes, anthraquinone, triclosan, acrylamide, and electromagnetic field, neutral red, benzene, nitrosoanatabine, 4-tert-butylbenzoyl)-2-hydroxy-1-naphthaldeyde hydrazone, mannitol, methanol, 4-biphenylamine, and 2,4,5-trichlorophenoxyacetic acid.

Next in step S116, the list 116 of harms may include 15 harms including biliary, bones and joints, breast, cognitive, connective tissue, ear, endocrine, eye, gastrointestinal, other heart condition, hematologic, immune, liver, liver cancer, and lung. In some embodiments, as in this example, each of the candidate litagion agents and/or harms may be or may include an identifier (e.g., CAS number) or the like.

In step S120, the lists 112, 116 may be used to identify documents exploring relationships between any one (or more) litagion agents of the candidate litagion agent list 112 and any one (or more) harms of the harm list 116. For instance, in steps S121 and S122, a computer or local server 104 may input each of the lists 112, 116 to a remote server 102. For example, the remote server 102 may include a document database 126, such as PubMed (or other online document corpus), and a search engine 124 for inputting the lists 112, 116 and for searching for documents within PubMed that includes in the abstract, title, or keywords any one (or more) litagion agents of the candidate litagion agent list 112 and any one (or more) harms of the harm list 116 (e.g., documents that contain both terms). Optionally, in step S123, query terms (e.g., query term list 123) may be input in the search engine 124 to refine the search, for instance to focus the query on documents that explore a causal relationship between the candidate litagion agent and the harm.

Then, in step S125, the search results 128 may be retrieved and transmitted to the local server 104. The search results 128 may be, for example, a count for each instance a document explores a causal relationship between any one (or more) litagion agents of the candidate litagion agent list 112 and any one (or more) harms of the harm list 116 (e.g., document contains both terms in addition to satisfying the query extensions). The search results may be raw counts of publications or may also be attenuated to reduce the weight of older documents in the counts.

In step S130, the computer or local server 104 (e.g., via an associated computer processor or the like) may analyze the search results 128. For instance, in step S132, the computer may be used to create an array 144' of the lists 112, 116 based on the search results, as shown for example in FIG. 6. In FIG. 6, each cell of the array 144' contains an attenuated number of agent-harm coincidences (i.e., documents that explore a relationship between any one (or more) litagion agents of the candidate litagion agent list 112 and any one (or more) harms of the harm list 116). For example, for the agent asbestos, 1045.11 documents discuss a relationship with the harm lung and 0.7 documents discuss a relationship with harm to the ear (which includes hearing).

Then in step S140, the data within the array 144' may be assessed for statistical significance. In particular, in step S142, the computer or local server 104 may apply the algorithm discussed to assess the statistical significant of each agent-harm coincidence (also called agent-harm pair) relative to other agent-harm coincidences, for example as shown in Table 1.

TABLE 1

| litagion agent | harm | iteration |
| --- | --- | --- |
| [1332-21-4]__[Asbestos] | lung_cancer | 1 |
| [1332-21-4]__[Asbestos] | lung | 1 |
| [80-05-7]__[bisphenol A] | reproductive | 1 |
| [69-65-8]__[Mannitol] | renal | 1 |
| [71-43-2]__[Benzene] | hematologic | 1 |
| [553-24-2]__[Neutral Red] | connective | 1 |
| [80-05-7]__[bisphenol A] | endocrine | 1 |
| [79-06-1]__[Acrylamide] | neuro | 1 |
| [1332-21-4]__[Asbestos] | gastrointestinal_cancer | 1 |
| [67-56-1]__[Methanol] | liver | 1 |
| [80-05-7]__[bisphenol A] | pregnancy | 1 |
| [UnknownCAS]__[electromagnetic fields] | cognitive | 1 |
| [UnknownCAS]__[electromagnetic fields] | neuro | 1 |
| [3380-34-5]__[Triclosan] | oral | 1 |
| [71-43-2]__[Benzene] | liver | 1 |
| [80-05-7]__[bisphenol A] | breast | 1 |
| [UnknownCAS]__[electromagnetic fields] | heart_other | 1 |
| [UnknownCAS]__[electromagnetic fields] | breast | 1 |
| [67-56-1]__[Methanol] | eye | 1 |
| [UnknownCAS]__[electromagnetic fields] | mental_disorder | 1 |
| [67-56-1]__[Methanol] | neuro | 1 |
| [UnknownCAS]__[Carbon nanotubes] | connective | 1 |
| [553-24-2]__[Neutral Red] | liver_cancer | 1 |
| [UnknownCAS]__[electromagnetic fields] | pregnancy | 1 |
| [UnknownCAS]__[Carbon nanotubes] | immune | 1 |
| [69-65-8]__[Mannitol] | heart_other | 1 |
| [UnknownCAS]__[Carbon nanotubes] | bonejoint | 1 |
| [69-65-8]__[Mannitol] | neuro | 1 |
| [67-56-1]__[Methanol] | muscle | 1 |
| [67-56-1]__[Methanol] | mental_disorder | 1 |
| [553-24-2]__[Neutral Red] | eye | 1 |
| [UnknownCAS]__[electromagnetic fields] | ear | 1 |
| [UnknownCAS]__[electromagnetic fields] | bonejoint | 1 |
| [92-67-1]__[4-biphenylamine] | liver | 1 |

TABLE 1-continued

| litagion agent | harm | iteration |
|---|---|---|
| [UnknownCAS]__[electromagnetic fields] | reproductive | 1 |
| [67-56-1]__[Methanol] | renal | 1 |
| [69-65-8]__[Mannitol] | eye | 1 |
| [93-76-5]__[2,4,5-Trichlorophenoxyacetic Acid] | pregnancy | 1 |
| [79-06-1]__[Acrylamide] | reproductive | 1 |
| [UnknownCAS]__[Carbon nanotubes] | lymphatic | 1 |
| [69-65-8]__[Mannitol] | endocrine | 1 |
| [553-24-2]__[Neutral Red] | oral | 1 |
| [84-65-1]__[9,10-anthraquinone] | liver | 1 |
| [92-67-1]__[4-biphenylamine] | liver_cancer | 1 |
| [69-65-8]__[Mannitol] | muscle | 1 |
| [71-43-2]__[Benzene] | bonejoint | 1 |
| [79-06-1]__[Acrylamide] | muscle | 1 |
| [3380-34-5]__[Triclosan] | immune | 1 |
| [93-76-5]__[2,4,5-Trichlorophenoxyacetic Acid] | reproductive | 1 |
| [67-56-1]__[Methanol] | cognitive | 1 |
| [UnknownCAS]__[Carbon nanotubes] | lung | 1 |
| [93-76-5]__[2,4,5-Trichlorophenoxyacetic Acid] | endocrine | 1 |
| [UnknownCAS]__[electromagnetic fields] | immune | 1 |
| [69-65-8]__[Mannitol] | immune | 1 |
| [UnknownCAS]__[Carbon nanotubes] | neuro | 1 |
| [553-24-2]__[Neutral Red] | liver | 1 |
| [79-06-1]__[Acrylamide] | pancreas | 1 |
| [3380-34-5]__[Triclosan] | bonejoint | 1 |

Applying the algorithm to the data in the array 144', a list of 58 litagion-agent pairs is reported. These litagion-agent pairs are more statistically significant relative to the other cells of the array and therefore are "salient." The salient litagion agent-harm pairs (in FIG. 7) include asbestos associated with lung disease, lung cancer, and gastrointestinal disease. It includes anthraquinone associated with liver disease. This list 150 may be stored by the computer or local server 104 and/or outputted. As discussed, the list 150, can then be used, for example, by insurance companies to prioritize their risks.

In some embodiments, before being outputted, this list 150 may be further prioritized, for example, based on statistical significance (e.g., the most statistically significant agent-harm coincidences prioritized higher less statistically significant agent-harms). For example, the asbestos/lung cancer may be atop the list 150 and the next most significant litagion agent represented by bisphenol A and reproductive harm.

In addition, in some embodiments, the algorithm may be re-run as many times as necessary. For example, a link between bisphenol A and reproductive harm may be well known in the academic community (though not in some other user communities), and therefore a list 150 that prioritizes this relationship at the top may not provide any new information. In such a case, such results can be removed or otherwise disregarded to obtain a new list of statistically significant agent-harm coincidences that are not as well known in the academic community or other communities.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

The invention claimed is:

1. A computer-implemented method, by a computer having a computer processor and a storage medium, of identifying emerging risks of one or more agents causing one or more harms to a particular system, the method comprising:
    accessing, via a computer network, an electronic document database comprising document data;
    inputting a set of criteria specified by a user, wherein inputting a set of criteria comprises inputting a first selected set having a plurality of agents and inputting a second selected set having a plurality of harms to a particular system;
    extracting a subset of the document data from the electronic document database that satisfies the set of criteria;
    generating, with the computer processor, an array based on the subset of document data extracted from the electronic document database, the array containing agent-harm coincidences from the extracted subset of the document data;
    assessing, with the computer processor, statistical significance of each agent-harm coincidence of the array relative to other agent-harm coincidences in the array;
    compiling, with the computer processor, risk data of one or more agents of the plurality of agents of the first selected set causing one or more harms of the plurality of harms of the second selected set, the risk data based on the statistical significances of the agent-harm coincidences in the array; and
    outputting the risk data;
    wherein the risk data is based on the statistical significances of the agent-harm coincidences in the array that meet or exceed a particular threshold; and
    wherein the particular threshold is determined by the statistical significances of the array.

2. The method of claim 1, the method further comprising: acquiring the first selected set of agents and the second selected set of harms.

3. The method of claim 2, wherein the first and second selected sets are acquired before inputting the first selected set and the second selected set.

4. The method of claim 1, the method further comprising:
    acquiring the first selected set of agents and the second selected set of harms; and
    revising, with the computer processor, the first selected set of agents and the second selected set of harms to be compatible with the electronic document database, the set of criteria comprising the revised first selected set of agents and the revised second selected set of harms.

5. The method of claim 1, wherein the document data comprises academic research.

6. The method of claim 1, wherein the risk data comprises a list of the one or more agents of the first selected set causing the one or more harms of the second selected set.

7. The method of claim 1, wherein the emerging risks correspond to one or more signals representative of academic research trends that explore relationships between the one or more agents of the first selected set causing the one or more harms of the second selected set.

8. The method of claim 7, wherein the particular system comprises the human body.

9. The method of claim 1,
    wherein the array contains quantities of agent-harm coincidences from the extracted subset of the document data;
    wherein assessing statistical significance comprises:
        assessing, with the computer processor, statistical significance of each agent-harm coincidence quantity relative to other agent-harm coincidence quantities in the array; and wherein compiling risk data comprises: compiling, with the computer processor, risk data of one or more agents of the plurality of agents of the first selected set causing one or more harms of the plurality of harms of the second selected set of the risk data based on the statistical significance of each agent-harm coincidence quantity in the array.

10. The method of claim 1, wherein the subset of document data, extracted from the electronic document database, comprises a plurality of documents that satisfy the set of criteria.

11. The method of claim 1, wherein the subset of document data, extracted from the electronic document database, is associated with a plurality of documents that satisfy the set of criteria.

12. The method of claim 11, wherein a document of the plurality of documents satisfies the set of criteria when the document contains at least one agent of the plurality of agents of the first selected set and at least one harm of the plurality of harms of the second selected set.

13. The method of claim 11, wherein the subset of document data, extracted from the electronic document database, comprises an identifier of each document that satisfies the set of criteria.

14. The method of claim 1, the method further comprising: restricting the document data of the electronic document base into a set of documents that discuss at least one agent causing at least one harm within a specific context; wherein extracting a subset comprises: extracting a subset of document data from the restricted set of documents that satisfies the set of criteria.

15. The method of claim 14, wherein restricting the document data comprises: inputting one or more query terms to restrict the document data of the electronic document base into a set of documents that discuss at least one agent causing at least one harm.

16. The method of claim 14, wherein the specific context comprises at least one of a risk context, toxicology context, and non-therapeutic context.

17. The method of claim 14, wherein each agent-harm coincidence corresponds to a respective document that satisfies the set of criteria.

18. The method of claim 1, wherein the first selected set of agents is at least partially defined by an authoritative source.

19. The method of claim 1, wherein the second selected set of harms comprises a taxonomy of harms that includes a plurality of different harm categories; and wherein the taxonomy is at least partially defined by an authoritative source.

20. The method of claim 19, wherein the taxonomy is based on the Medical Subject Headings (MeSH) system.

21. The method of claim 1, wherein the electronic document database comprises at least one of PubMed and the Research Portfolio Online Reporting Tools (RePorter).

22. The method of claim 1, wherein the electronic document database is accessed via a search engine associated with the electronic document database.

23. The method of claim 22, the method further comprising: inputting the set of criteria in the search engine.

24. The method of claim 1, the method further comprising: weighing the statistical significance of the agent-harm coincidences in the array; wherein the risk data is based on the weighed statistical significance of the agent-harm coincidences in the array.

25. The method of claim 24, wherein the statistical significance of the agent-harm coincidences is weighed based on the age of the document containing each respective agent-harm coincidence.

26. The method of claim 1, wherein generating an array comprises: generating, with the computer processor, a plurality of arrays, each array of the plurality of arrays containing the number of agent-harm coincidences from the subset of document data, extracted from the electronic document database, from a respective time period; wherein assessing statistical significance comprises: assessing, with the computer processor, statistical significance of each agent-harm coincidence of the each array of the plurality of arrays relative to other agent-harm coincidences in the each array of the plurality of arrays; and wherein compiling risk data comprises: compiling for the each array of the plurality of arrays, with the computer processor, risk data of one or more agents of the plurality of agents of the first selected set causing one or more harms of the plurality of harms of the second selected set, the risk data based on the statistical significances of the agent-harm coincidences in the each array of the plurality of arrays.

27. The method of claim 26, the method further comprising: compiling the risk data for the each array of the plurality of arrays; wherein outputting risk data comprises: outputting the compiled risk data.

28. The method of claim 1, the method further comprising: storing the array on the storage medium of the computer; storing the statistical significances on the storage medium of the computer; storing the risk data on the storage medium of the computer; and outputting, by the computer processor, the risk data stored on the storage medium of the computer.

29. The method of claim 1, wherein the computer processor is part of a first server; and wherein the electronic document database is embodied on a second server remote from the first server.

30. The method of claim 1, wherein the array comprises a contingency table having at least two dimensions; and wherein a first dimension includes the plurality of agents of the first selected set and a second dimension includes the plurality of harms of the second selected set.

31. The method of claim 30, wherein a third dimension is time.

32. The method of claim 1, wherein assessing, with the computer processor, statistical significance of each agent-harm coincidence of the array relative to other agent-harm coincidences in the array comprises: comparing an agent-harm statistical distribution of to a benchmark on a hypothesis of independence.

33. The method of claim 1, wherein generating an array comprises: generating, with the computer processor, arrays based on the subset of document data, extracted from the electronic document database, the arrays containing the number of agent-harm coincidences from the extracted subset of the document data corresponding to the date each document was created.

34. The method of claim 1, wherein the first and second selected sets are input substantially at the same time.

35. The method of claim 1, wherein the first and second selected sets are input together.

36. The method of claim 1, the method further comprising:
deriving a threshold based on the statistical significance of each agent-harm coincidence;
wherein the risk data is compiled based on the agent-harm coincidences in the array that exceed the threshold.

37. The method of claim 1, the method further comprising:
removing agent-harm coincidences in the array having statistical significances that exceed a specific threshold;
wherein the risk data is compiled based on the remaining agent-harm coincidences in the array.

38. The method of claim 1, wherein the risk data comprises data representative of a potential threat that the one or more agents of the plurality of agents of the first selected set causing the one or more harms of the plurality of harms of the second selected set.

39. A computer method for use on a computer comprising a computer-usable medium having a computer-readable program code embodied therein, said computer-readable program code adapted to be executed by a computer processor to implement a method of identifying emerging risks of one or more agents causing one or more harms to a particular system, the method comprising:
accessing, via a computer network, an electronic document database comprising document data;
inputting a set of criteria specified by a user, wherein inputting a set of criteria comprises inputting a first selected set having a plurality of agents and inputting a second selected set having a plurality of harms to a particular system;
extracting a subset of the document data from the electronic document database that satisfies the set of criteria;
generating, with the computer processor, an array based on the subset of document data extracted from the electronic document database, the array containing the number of agent-harm coincidences from the extracted subset of the document data;
assessing, with the computer processor, statistical significance of each agent-harm coincidence of the array relative to other agent-harm coincidences in the array;
compiling, with the computer processor, risk data of one or more agents of the plurality of agents of the first selected set causing one or more harms of the plurality of harms of the second selected set, the risk data based on the statistical significances of the agent-harm coincidences in the array; and
outputting the risk data;
wherein the risk data is based on the statistical significances of the agent-harm coincidences in the array that meet or exceed a particular threshold; and
wherein the particular threshold is determined by the statistical significances of the array.

40. A method of identifying emerging risks of one or more agents causing one or more harms to a particular system, the method implemented on a computer comprising a computer process, a mass storage device, and volatile memory, the method comprising:
inputting a set of criteria specified by a user, wherein inputting a set of criteria comprises inputting a first selected set having a plurality of agents and inputting a second selected set having a plurality of harms to a particular system;
processing, with the computer processor, the set of criteria;
accessing, via a computer network, an electronic document database contained in at least one storage medium embodied on a server, the electronic document database comprising document data;
extracting a subset of the document data from the document database that satisfies the set of criteria;
storing the subset of document data, extracted from the electronic document database, in at least one of the mass storage device of the computer and the volatile memory of the computer;
generating, with the computer processor, an array based on the stored subset of the document data, the array containing the number of agent-harm coincidences from the extracted subset of the document data;
storing the array in the at least one of the mass storage device of the computer and the volatile memory of the computer;
assessing, with the computer processor, statistical significance of each agent-harm coincidence of the array relative to other agent-harm coincidences in the array;
storing the statistical significance of each agent-harm coincidence of the array relative to other agent-harm coincidences in the array in the at least one of the mass storage device of the computer and the volatile memory of the computer;
compiling, with the computer processor, risk data of one or more agents of the plurality of agents of the first selected set causing one or more harms of the plurality of harms of the second selected set, the risk data based on the stored statistical significances of the agent-harm coincidences in the at least one of the mass storage device and the volatile memory;
storing the risk data in the at least one of the mass storage device of the computer and the volatile memory of the computer; and
outputting, by the computer processor, the stored risk data;
wherein the risk data is based on the statistical significances of the agent-harm coincidences in the array that meet or exceed a particular threshold; and
wherein the particular threshold is determined by the statistical significances of the array.

* * * * *